United States Patent
Shanbhogue et al.

(10) Patent No.: US 12,086,424 B2
(45) Date of Patent: Sep. 10, 2024

(54) MEMORY ENCRYPTION ENGINE INTERFACE IN COMPUTE EXPRESS LINK (CXL) ATTACHED MEMORY CONTROLLERS

(71) Applicant: Intel Corporation, Santa Clara, CA (US)

(72) Inventors: Vedvyas Shanbhogue, Austin, TX (US); Siddhartha Chhabra, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 235 days.

(21) Appl. No.: 17/349,509

(22) Filed: Jun. 16, 2021

(65) Prior Publication Data

US 2021/0311643 A1 Oct. 7, 2021

Related U.S. Application Data

(60) Provisional application No. 63/069,495, filed on Aug. 24, 2020.

(51) Int. Cl.
*G06F 3/06* (2006.01)
*G06F 9/455* (2018.01)
(Continued)

(52) U.S. Cl.
CPC .......... *G06F 3/0622* (2013.01); *G06F 3/0631* (2013.01); *G06F 3/0679* (2013.01);
(Continued)

(58) Field of Classification Search
CPC .... G06F 3/0622; G06F 3/0631; G06F 3/0679; G06F 9/45558; G06F 9/5016;
(Continued)

(56) References Cited

U.S. PATENT DOCUMENTS

| 2019/0042402 | A1* | 2/2019 | Chhabra | G06F 9/45558 |
| 2019/0087354 | A1* | 3/2019 | Chhabra | G06F 21/64 |
| 2020/0371700 | A1* | 11/2020 | Stabrawa | G06F 3/0631 |

OTHER PUBLICATIONS

NPL Compute Express Link Specification Revision 1.0 Mar. 2019. <URL: computeexpresslink.org/copy-of-spec-landing>. Attached document is a reproduction of p. 145 of the NPL. (Year: 2019).*

* cited by examiner

*Primary Examiner* — David Yi
*Assistant Examiner* — Zubair Ahmed
(74) *Attorney, Agent, or Firm* — JAFFERY WATSON MENDONSA & HAMILTON LLP

(57) ABSTRACT

Securing communications over a compute express link (CXL) is performed by receiving allocation of memory in a memory device and a key identifier (ID) to a trusted execution environment virtual machine (TEE VM); configuring a random key for the key ID by sending a random key configuration request to instruct a device security manager (DSM) of the memory device to configure a memory encryption engine (MEE) of the memory device with the random key and the memory allocation; initializing the allocated memory using the random key; and enabling secure access by the TEE VM to the allocated memory over the CXL by encrypting data transfers from the TEE VM to the memory device using the random key or decrypting data transfers from the memory device to the TEE VM using the random key.

15 Claims, 8 Drawing Sheets

(51) Int. Cl.
*G06F 9/50* (2006.01)
*H04L 9/08* (2006.01)

(52) U.S. Cl.
CPC ........ *G06F 9/45558* (2013.01); *G06F 9/5016* (2013.01); *H04L 9/088* (2013.01)

(58) Field of Classification Search
CPC ...... G06F 3/0623; G06F 3/0604; G06F 3/067; G06F 2009/45583; H04L 9/088; H04L 9/14
USPC ................................................ 711/164, 163
See application file for complete search history.

MEMORY ENCRYPTION ENGINE INTERFACE IN COMPUTE EXPRESS LINK (CXL) ATTACHED MEMORY CONTROLLERS

RELATED APPLICATIONS

This application claims the benefit of priority from U.S. Provisional Patent Application Ser. No. 63/069,495 filed on Aug. 24, 2020, the full disclosure of which is incorporated herein by reference.

TECHNICAL FIELD

Examples described herein are generally related to managing access to memory devices in a computing system.

BACKGROUND

Compute Express Link (CXL) is an open standard interconnect for high-speed central processing unit (CPU) to device and CPU-to-memory communications, designed to accelerate next-generation data center performance. CXL is built upon the Peripheral Component Interconnect express (PCIe) physical and electrical interface specification (conforming to version 3.0 or other versions of the PCIe standard published by the PCI Special Interest Group (PCI-SIG)) with protocols in three areas: input/output (I/O), memory and cache coherence.

There are three memory device types defined in CXL: Type 1, Type 2, and Type 3. A Type 1 CXL device implements a fully coherent cache but no host-managed device memory, extends the PCIe protocol capability (for example, atomic operation), may need to implement a custom ordering model, and includes applicable transaction types of device-to-host (D2H) coherent and host-to-device (H2D) snoop transactions. A Type 2 CXL device implements an optional coherent cache and host-managed device memory. Typical applications for Type 2 are devices which have high-bandwidth memories attached. Applicable transaction types for Type 2 are all CXL.cache/mem transactions. A Type 3 CXL device only has host-managed device memory. A typical application for Type 3 is a memory expander for the host. Applicable transaction type for Type 3 include CXL.mem, memory read (MemRd) and memory write (MemWr) transactions.

DETAILED DESCRIPTION

As contemplated in the present disclosure, a memory encryption engine (MEE) is provided to support memory encryption for CXL devices. A memory mapped input/output (MMIO)-based configuration and capability enumeration interface is defined to support accessing the MEE by other devices in a computing system. The interface allows memory device vendors to produce devices that can interoperate with memory devices from any memory device vendor.

Type 2 and Type 3 CXL devices support device side memories that are mapped into a host address space. Such endpoint memory devices may to support a MEE. Embodiments of the present invention define the requirements and interfaces that a memory device may support to allow device attached memory to be mapped into the host address space and be usable for trusted execution environment (TEE) I/O usages. The memory controller (MC) in Type 2 and Type 3 devices is configured and setup using the CXL.io interface. Such memory devices may support a base address register (BAR) to map the register interface to configure keys into the MEE. Certain memory devices implement device attached memory where such memory is used by logic in the memory device but is not directly mapped into the host address space. Such memory devices may implement a mechanism like memory encryption to provide confidentiality to data stored into those memory devices. Such memory devices may additionally provide integrity properties on the memory content and track ownership of the memory content. Such memory devices may manage the security of trusted execution environment (TEE) virtual machine (TVM) data if the TVM data is stored in such memory attached devices.

The following acronyms are used herein: TEE—trusted execution environment; TSM—TEE security manager; DIMP—device interface management protocol; IDE—integrity and data encryption; PF—physical function; MC—memory controller; TCB—Trusted Computing Base; CXL—compute express link; IOMMU—I/O memory management unit; DSM—device security manager.

Figure 1:
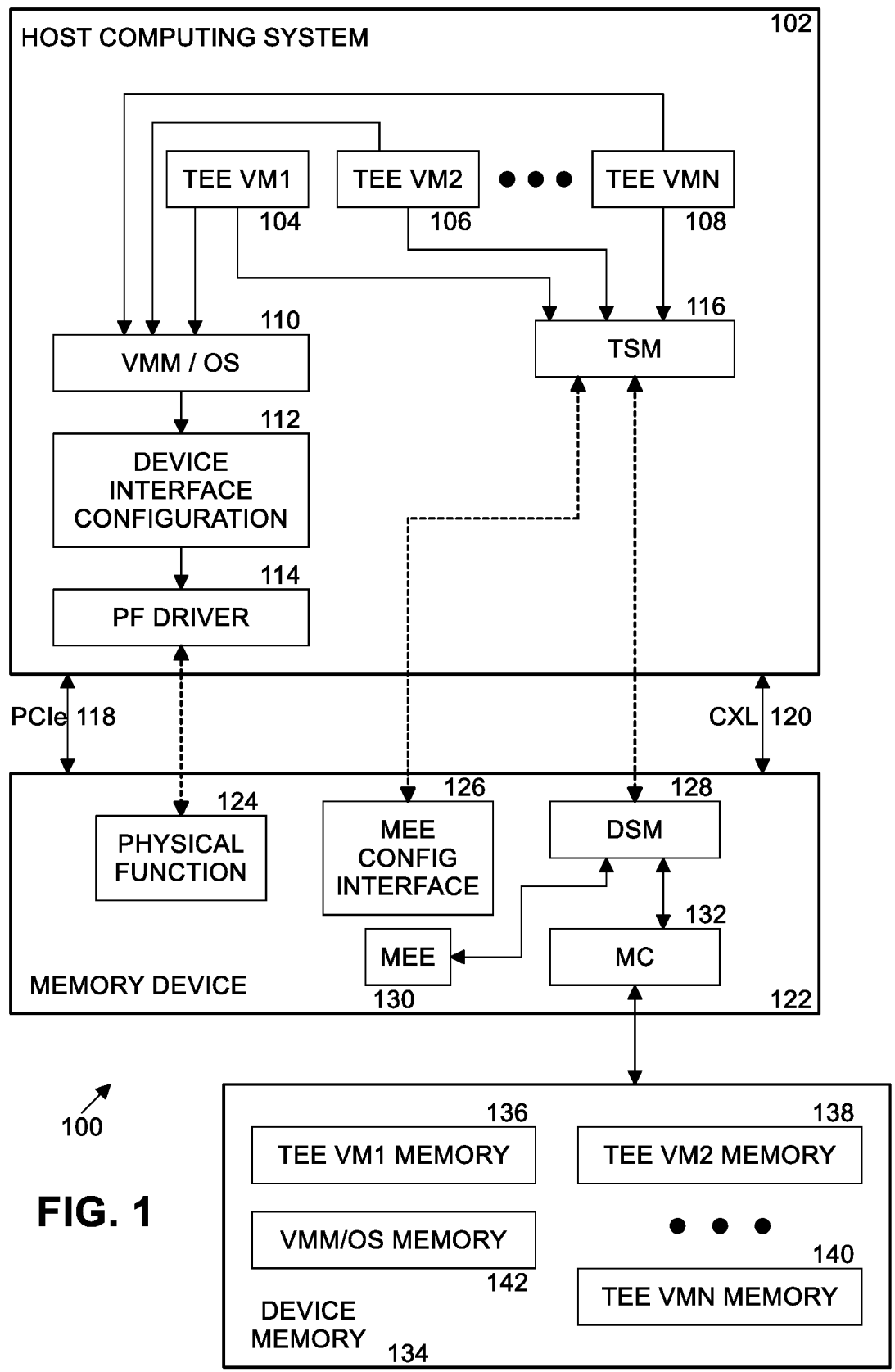
FIG. 1 illustrates an example of a system according to some embodiments.

FIG. 1 illustrates an example of a system 100 according to some embodiments. System 100 includes a host computing system 102 coupled to a memory device 122 over a peripheral component interconnect express (PCIe) link 118 and a CXL link 120. Although only one memory device is shown, there may be any number of memory devices coupled to host computing system 102. Memory device 122 may also be called a remote memory device storing remote memory (being remote from the host computing system). Existing unsecure data transfers and communications are performed over PCIe 118 using virtual machine manager (VMM)/Operating System (OS) combination 110, device interface configuration 112, physical function (PF) driver 114 on the host computing system, and PF 124 on the memory device. PF 124 interfaces with memory controller (MC) 132 to write data to and read data from VMM/OS memory 142 in device memory 134 (e.g., physical memory media). In one embodiment, device memory 134 is integral with memory device 122. In another embodiment, device memory 134 is separate from and communicatively coupled with memory device 122.

VMM 110 (also known as a hypervisor) is system software that is used to create, edit, start, and stop virtual machines (VMs). VMM 110 may employ dedicated virtualization hardware supported by the processor instruction set to perform virtualization of host computing system 102 (including processor and memory resources) to a VM in an efficient manager and with high fidelity such that the software executing as a VM sees a virtual computer system that is as close to a physical computer system as possible. The VMM typically holds the administrative interfaces to devices in the host computing system. Such administrative interfaces may be in the form of a PF in a PCIe or CXL device. The VMM includes PF driver 114 that provides an interface to the VMM configuration and control software stack (e.g., device interface configuration 112) to establish device configurations and administer the device capabilities (e.g., for memory device 122).

In embodiments, additional components are included in host computing system 102, memory device 122, and device memory 134 to provide secure transfers of data over CXL 120.

One or more trusted execution environment (TEE) virtual machines (TEE VMs) are used for confidential computing. The example system of FIG. 1 shows TEE VM1 104, TEE VM2 106, . . . TEE VMN 108, where N is a natural number. These virtual machines, unlike traditional or legacy VMs, do not need to trust the hosting VMM/OS 110 on the host computing system for their security. The VMM/OS 110 are still expected to perform resource management actions such as allocating memory, allocating process execution time, etc. for the TEE VMs. The code and data of these TEE VMs is isolated from the VMM/OS 110 by cryptographic encryption to provide confidentiality. The memory pages used to hold the code and data are integrity protected such that attempts by the VMM/OS or other entities not trusted by the TEE VM can be detected and/or prevented. Applications desiring protected access over CXL 120 to memory device 122 can be run in a TEE VM to be protected.

TEE security manager (TSM) 116 is a logical security agent in the host computing system 102 that is responsible for establishing the security isolations and access controls to protect the confidentiality and integrity of TEE VMs 104, 106, . . . 108. TSM 116 is inside the trust boundary of all TEE VMs. In one embodiment, in a host computing system 102 including a processor supporting Trust Domain Extensions (TDX) provided by Intel Corporation, the TSM functionality is realized by a digitally signed security services module (not shown in FIG. 1) (called the Intel TDX-module) that executes in a secure processor mode called the secure arbitration mode (SEAM).

TEE VMs do not trust the VMM. To create, edit, start, and stop TEE VMs, VMM 110 uses the interfaces provided by the TSM. The VMM continues to provide the roles of resource allocation and platform administration but the TSM ensures that the VMM cannot violate the confidentiality and integrity of TEE VMs 104, 106, . . . 108 while retaining the resource management role. To ensure the confidentiality and integrity of the memory allocated to the TEE VMs by the VMM, TSM 116 enables memory security mechanisms such as configuring encryption and integrity protection by establishing TEE VM specific memory encryption keys into a MEE 130 that is typically implemented in a memory controller 132 used to control memory devices 122 such as double data rate (DDR) and high bandwidth memory (HBM) devices attached to the host computing system. To enable MEE 130 to determine which TVM is making the memory request, and thereby select the memory encryption key to be used for that request, TSM 116 associates an identifier (ID) per TEE VM. When the TEE VM accesses memory, the memory requests are accompanied by the ID assigned by the TSM and MEE 130 uses this ID as the memory-encryption key identifier (MKID) to identify the cryptographic key used to encrypt or decrypt the data associated with the request, generate or verify a message authentication code (MAC) associated with the encrypted data, or to identify when the memory accessed by the request is memory associated with that MKID. As used herein, a MKID is a key ID. In embodiments, MEE 130 may implement one or more such capabilities. TSM 116 is responsible for configuring the MEE in the host computing system 102 as part of lifecycle actions such as creating the TEE VM, associating memory to the TEE VM, etc. Similar to the TEE VM, TSM 116 does not trust VMM 110 and thus expects the VMM to attempt to subvert the security of the TEE VM/TSM solution including through the use of administrative functions such as the physical function in devices that would be used by the TSM and/or the TEE VM.

Compute Express Link (CXL) 120 is a high performance I/O bus architecture used to interconnect peripheral devices that can be either traditional non-coherent I/O devices, memory devices, or accelerators with additional capabilities. CXL attached devices can be classified into three profiles—type 1, type 2 and type 3. Type 1 are devices that have special needs that have a fully coherent cache in the device. CXL supports such devices using its CXL.cache link through which an accelerator can use the CXL.cache protocol to be cache coherent. CXL type 2 devices, in addition to being fully cache coherent, also have memory such as DDR or high bandwidth memory (HBM). To support such devices, CXL provides a CXL.mem link through which the host computing system can access accelerator attached memory. Type 3 devices are memory devices 122 and their memory is accessed over the CXL.mem link. Type 3 devices do not compute on the data but are memory devices enabling the host computing system to expand the memory available in a mode flexible manner using the CXL.mem link. All three types of devices have a CXL.io link which is used for configuration and control. The CXL type 2 and 3 devices (such as memory device 122) expose memory that the host computing system can store data into and optionally be computed on by the memory device (type 2). Methods and apparatus used by the TSM to enable security of the memory attached to memory controllers in CXL type 2 and 3 memory devices are able to locate TEE VM code and data in the memory devices such that this code/data is as well or better protected compared to such code/data being placed in memory devices attached to host memory controllers.

Device security manager (DSM) 128 is a logical entity in the CXL type 2 and 3 memory devices 122. DSM 128 is relied upon by TSM 116 to enable security mechanisms in the device memory 134 attached to the CXL device 122 in order to place TEE VM code and data in the device memory. TSM 116 first establishes the trust worthiness of the DSM. The TSM authenticates the DSM using protocols such as the distributed management task force (DMTF) defined security protocol and data model (SPDM) to establish the identity of the manufacturer of the device, identity of the device model, and the part number of the device. Such identities are established by having the device manufacturer provision certificates in the memory device including a per part certificate that is signed by the manufacturer's model certificate, which itself is signed by the manufacturer's certificate. The TSM can then challenge the memory device to prove it is genuine by signing the challenge using the per part private key corresponding to the per part certificate. The per part device private key is a secret that enables this authentication. TSM 116 then obtains measurements of firmware and other configurations in the memory device using a protocol such as the DMTF defined SPDM. The TSM then verifies the identity and measurements to determine if the CXL memory device 122 has acceptable security for hosting code and data of TEE VMs 104, 106, . . . 108.

DSM 128 may further provide an interface 126 to TSM 116 to enumerate and configure MEE 130 in such memory devices 122.

Memory devices may include a number of configurations such as address decoders, target row refresh configurations, DDR timing parameters, debug interfaces, etc. Misconfiguring such memory devices may be used as a mechanism to subvert the security of code and data stored in the memory devices. For example, memory device 122 may be configured with address decoders that cause aliases such that accesses using two system physical addresses decode to the same device physical addresses. The host computing system may implement access controls on one of the system physical addresses to secure the data but may not be aware of the alias system physical address and thus may not have put access controls or restrictions in place to prevent the use of the alias. An attacker may then use the alias system physical address to access the data and thus bypass the access controls put in place by TSM 116 in the host computing system. To address these issues DSM 128 provides a mechanism by which the TSM can request the configurations of the memory device to be locked down and verify the configurations to ensure they are secure (e.g., do not have aliases, the DDR refresh intervals are sufficient to mitigate attacks such as row hammer attacks, there are no debug interfaces configured to leak data, etc.). The DSM, by locking down the configuration prior to these memory security checks, ensures that once the checks are complete the configurations cannot be tampered with subsequently. The TSM then only locates TEE VM code and data in such devices if the DSM indicates that the memory security checks have completed successfully.

MEE 130 provides memory confidentiality and integrity properties to data stored in memory device 122. Memory encryption involves using a cryptographic cipher to enforce confidentiality of the data stored in the memory devices. Devices that support memory encryption capability may support MEE 130. The memory encryption scheme may protect against ciphertext manipulation such as flipping a bit of ciphertext to cause a corresponding bit of plaintext to be flipped. The memory encryption scheme employed may provide the property that the same plaintext at two different physical addresses do not produce the same ciphertext. This property helps to mitigate threats associated with cut-and-paste and splicing attacks. One example of a memory encryption scheme that provides this property is advanced encryption standard (AES-XTS) using the physical address where the data is stored as the tweak value as described in (Standard for Cryptographic Protection of Data on Block-Oriented Memory Devices, May 2007 (IEEE P1619/D16).

Memory integrity is the property that ensures that when a specific TEE VM reads data from an address, the data returned will be same as the data that was written to that address by that TEE VM—and if data being read from a request was not written by the requesting TVM, then memory poison may be returned. The memory integrity property may be achieved through one of the following mechanisms.

The memory integrity property may be achieved by associating an authentication tag with the data stored in memory. The authentication tag may be generated using a cryptographic message authentication code (MAC) such as the secure hash algorithm described in Permutation-Based Hash and Extendible Output Functions, Aug. 5, 2015 (SHA3-KMAC-256), generated over the data and address where the data is stored. To optimize the memory overhead the authentication tag may be a truncated version of the MAC.

The memory integrity property may be achieved through memory ownership tracking. Memory ownership is tracking the ownership of the data such that the memory device 122 can distinguish if the data was created by a TEE VM or by an entity that is not a TEE VM, and/or for any TEE VM, the identity of the TEE VM used to create the data. If the memory ownership property is supported, then the memory device may at a minimum provide the ownership tracking to determine if the data was created by a TEE VM or an entity that is not a TEE VM. The memory device may track memory ownership at a cache line granularity or at the granularity of a group of cache lines (e.g., a 4K page frame). Devices that implement memory ownership tracking may guarantee that the plaintext of memory written by a TEE VM can only be read by the same TEE VM, and all memory being read by a TEE VM was previously written by the same TEE VM.

To enable each TEE VM 104, 106, . . . 108 to be uniquely encrypted in device memory 134 (e.g., TEE VM1 memory 136, TEE VM2 memory 138, . . . TEE VMN memory 140) the MEE supports the use of multiple encryption keys. For example, a memory device designed to support a host computing system 102 that can create 2,048 TEE VMs may support 2,048 memory encryption keys to be configured. Each memory encryption key is identified by an identifier called a key ID. TSM 116 assigns a key ID to a TEE VM when the TEE VM is created. The host computing system then ensures that memory requests originated by a TEE VM are tagged with that key ID to identify the TEE VM. The host computing system may not allow a TEE VM to originate requests with a key ID not associated with that TVM. Likewise, the host computing system may not allow non-TEE VM entities such as VMM 110 to originate requests with TEE assigned key IDs.

In one embodiment, the key ID may be physically transported to the MEE 130 from the processor core of host computing system 102 using a configurable number of upper bits of the address field of the memory requests. For example, a host computing system configured to support 512 key IDs may use the uppermost 9 bits of the address to transport the key ID. These address bits cannot be used to actually address memory as they are now being repurposed for encoding the key ID and thus reduce the amount of memory the host computing system can address. However, such a mechanism is more efficient from a performance and cost perspective as it does not require transporting an additional key ID field with the memory requests. In this embodiment, the MEE may support a configuration register (e.g., in MEE config interface 126) to configure the number of bits of the address field that will be used to encode the key ID. In another embodiment the key ID may be transported using a new field associated with the memory request.

In one embodiment, the total number of keys supported by the MEE are used for encrypting TEE VM code and data. In an embodiment, some of these keys may be made available to the VMM 110 to use for encrypting VMM code and data or the code and data of legacy VMs. In one embodiment the set of keys are statically partitioned between TEE VM reserved keys and VMM usable keys. In this embodiment the MEE may provide a mechanism to configure this reservation.

In another embodiment, the sharing of keys is flexible and any key may be used for TEE VM usage or VMM usage. In the embodiment once a key has been configured for a key ID as a TEE VM key, the VMM may not have the privilege to clear that key or reconfigure the key for the key ID until the TSM has released that key ID by clearing the key.

Some MEEs may support multiple encryption algorithms. This may be due to regulatory requirements such as adhering to the cryptographic standards of a country. This may also be to provide flexibility between security and performance where certain cryptographic algorithms may have higher performance overhead. Such a MEE may support configuring the algorithm to use along with the encryption key itself as part of configuring a key ID.

Some MEEs, or DSM 128 configuring the MEE, include a random number generator that can be used as an entropy source to generate memory encryption keys. TSM 116 then requests DSM 128 to generate the key using such random number generators. When the DSM does not have a random number generator, the TSM may use a random number generator available to the host computing system 102 as the entropy source to generate the key. In some cases, the keys may be ephemeral (e.g., when the memory media in device memory 134 is not persistent. In other cases, the memory media in device memory 134 is persistent and the TSM provides the key for the encryption such that the encrypted code and data may persist across power cycles.

In some computing systems, a range of memory is set aside ahead of time for special purposes. An example of such ranges is the protected memory range that is used to locate code and data of enclaves such as those created using Intel Software Guard extensions (SGX). Another example is where a range of memory is carved out for use by a special microcontroller embedded in the host computing system (such as a power management unit or a security services controller). This memory is then encrypted and integrity protected by the MEE. In such usages the key for the encryption is associated with the range itself instead of being identified by a key ID. The MEE may support zero or more range registers to configure such ranges and allow associating an encryption key with each such range. Typically, such ranges are not movable and thus the MEE may support an ability to lock the range configuration and the corresponding key to prevent security breaches caused by inadvertently or maliciously moving or disabling the range.

The configuration options provided by MEE 130 can be enumerated through the configuration interface 126 of the MEE such that TSM 116 can programmatically learn and use the capabilities of the MEE.

A CXL type 2 and 3 memory device 122 that includes a MEE 130 provides a MEE configuration interface 126 to configure and control the MEE. In one embodiment, the interface is in the form of a set of memory mapped registers that can be used to configure the MEE and load cryptographic keys into the MEE. Some memory devices include two identical register sets such that two entities (e.g., the TSM and the VMM) can both interact with the MEE in the memory device. To protect the transactions from being eavesdropped or tampered with on the I/O bus such as CXL.io, TSM 116 first enables encryption of the transactions on the I/O bus (e.g., PCIe link 118) using protocols such as the PCI-SIG defined Integrity and Data Encryption (IDE). The IDE scheme may be applied to all transactions on the bus or may be applied selectively to some transactions on the bus such as those targeting the registers forming the MEE configuration interface. In such a scheme the MEE offers differentiated services based on which interface was used to access the MEE. For example, the interface intended to be used by the TSM may enable higher privileges such as allowing the ability to load cryptographic keys for key IDs reserved or configured for use by TEE VM, whereas the interface used by the VMM may not have that privilege. In such a scheme, the memory device may use an indication on the I/O bus, such as CXL.io, that carries the transaction that accesses the registers to determine if the request originated from the TSM or the VMM. In one embodiment using CXL.io, this indication may take the form of the "TEE" bit in the Integrity and Data Encryption protocol (IDE) packet prefix. The host computing system 102 sets this indicator only for requests originating from the TSM and not the VMM, thereby allowing the MEE to provide this differentiated service. Placing the register interface to be used by the TSM into a secure state where it only accepts such trusted transactions may be accomplished by a command from the TSM such as the LOCK_INTERFACE_REQUEST issued to the DSM on a secure communication session such as that established when the TSM authenticates the DSM using a protocol such as SPDM.

In another embodiment, MEE configuration interface 126 does not comprise a set of registers but may be in the form of one or more cryptographic keys configured into DSM 128 by TSM 116. Such cryptographic keys are configured into the DSM by the TSM on a secure communication session such as that established when the TSM authenticates the DSM using a protocol such as SPDM. All command/configuration requests to the MEE are then wrapped using this cryptographic key as encrypted and authenticated messages. The message header includes an indication about the key used to perform the authenticated encryption. The TSM configures one of the keys as suitable for use by the VMM and the other as that to be used by the TSM itself. Thus, the ability to generate a packet using a key also provides proof of the identity of the requester (e.g., one of a TSM or a VMM). The MEE provides differentiated services based on the key that was used to form the request. For example, the key intended to be used by the TSM may enable higher privileges such as allowing the ability to load cryptographic keys for key IDs reserved or configured for use by TEE VM, whereas the key intended to be used by the VMM may not have that privilege.

DSM 128 provides one or more of the following requests through the configuration interface. DSM 128 learns the configuration options and capabilities supported by the DSM and MEE. DSM 116 establishes configurations, such as the bits used to extract a key ID, partition of key IDs, etc. DSM 116 configures a TSM or VMM specified key and algorithm for a key ID. DSM 116 configures a DSM generated key and algorithm for a key ID when requested by the TSM or VMM 110. DSM 116 clears a previously configured key for a key ID. DSM 116 configures a TSM or VMM specified key and algorithm for a pre-defined range of memory. DSM 116 configures a DSM generated key and algorithm for a pre-defined range of memory when requested by the TSM or VMM.

Figure 2A:
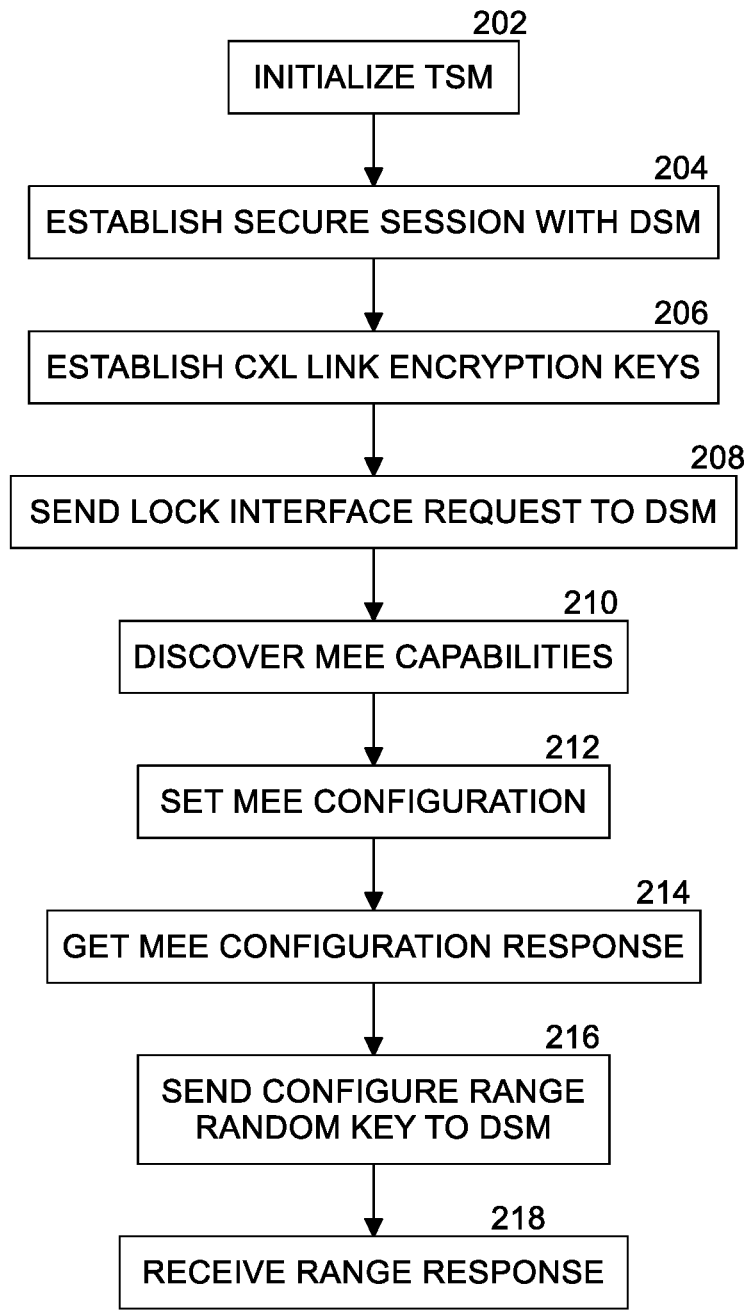
FIG. 2A illustrates an example of interactions between a virtual machine manager (VMM), a trusted execution environment security manager (TSM), a device security manager (DSM), and a memory encryption environment (MEE) according to some embodiments.

FIG. 2A illustrates an interaction between a trusted execution environment security manager (TSM) 116 and a device security manager (DSM) 128 according to some embodiments.

During a first initialization step, the following actions are performed in one embodiment. At block 202, VMM 110 initializes the MEE. At block 204, TSM 116 uses a KEY EXCHANGE message to establish a secure SPDM session between the TSM and DSM 116. The key exchange sequence involves the TSM authenticating the DSM's hardware identity. Optionally, the DSM may authenticate the TSM's identity. On successful completion of this exchange, a SPDM session is established between the TSM and DSM.

During a second initialization step, the following actions are performed in one embodiment. At block 206, TSM 116 establishes encryption keys for protecting data transfers (e.g., via encryption) over CXL link 120. TSM 116 generates the IDE encryption keys for the selective IDE stream and configures the IDE engines in a root complex of I/O ports on the host computing system. TSM 116 distributes the keys to the DSM 128 using a KEY_PROGRAMMING request over the SPDM session to configure the keys for each sub-stream of the selective IDE stream established between the root complex and the memory device 122. The DSM configures the IDE stream keys in the memory device. All keys and subsequent key refreshes for an IDE stream may be performed with KEY_PROGRAMMING requests received over the same SPDM session. Keys are programmed for both the CXL.io and CXL.mem interfaces of CXL link 120.

At block 208, TSM 116 sends a lock interface request to DSM 128. TSM 116 generates and sends the LOCK_INTERFACE_REQUEST message over the SPDM session to the DSM. The LOCK_INTERFACE_REQUEST is used to move the CXL interface into a LOCKED state. In response to the LOCK_INTERFACE_REQUEST, DSM 128 locks the configuration and performs memory device security checks. DSM 128 starts monitoring for configuration changes or other events that affect the interface configuration or security properties. The LOCK_INTERFACE_REQUEST also binds the device interface to the selective IDE stream previously established with memory device 122. A TEE VM may only accept device interfaces from memory devices with which the DSM has established the SPDM session and established the IDE streams for securing the link. The device interfaces assigned to the TEE VM are bound to an IDE stream as part of transitioning the device interface to the LOCKED state. The DSM rejects a LOCK_INTERFACE_REQUEST if all keys for the IDE stream specified by the LOCK_INTERFACE_REQUEST were not configured over the SPDM session on which the LOCK_INTERFACE_REQUEST was received.

During a start MEE interface step, the following actions are performed in one embodiment. The device side memory used by TSMs should have their memory encryption keys programmed in a trusted manner by the TSM. Once the memory controller has been transitioned to the LOCKED state, the TSM generates a START_INTERFACE_MMIO_REQUEST to the DSM to move the MEE configuration registers to the enabled state.

To discover MEE capabilities, configure the MEE, and issue commands to configure keys into the MEE, the following actions are performed in one embodiment. At block 210, TSM reads the MEE capabilities registers to discover MEE capabilities. At block 212, TSM configures and sets MEE configuration registers. TSM 116 configures keys into MEE 130 for key IDs as needed. For example, when a new TEE VM is created, the TSM assigns a key ID to the TEE VM and configures a key for that key ID using the MEE command mailbox.

At block 214, TSM gets the MEE configuration response. At block 216, in an embodiment, TSM 116 sends a CONFIGURATION_RANGE_RANDOM_KEY request to DSM 128. In response to the CONFIGURATION_RANGE_RANDOM_KEY request, DSM 128 configures a range of key IDs in MEE 130. In an embodiment, DSM 128 then sends a CONFIGURATION_RANGE_RANDOM_KEY_RESPONSE back to TSM 116.

Memory encryption involves using a cryptographic cipher to enforce confidentiality of the data stored in the memory devices. The memory device may provide at least 256-bit strength with the cryptographic cipher used for memory encryption. The memory device may provide a mechanism to bind the encryption to the location of data memory to address threats associated with copy/paste, splicing, etc., of the data at rest.

Memory integrity is the property that ensures that TVM/TSM reads back the same data that was last written to the memory device. A memory device may enumerate whether the memory device provides this memory integrity property.

Memory ownership is tracking the ownership of the data such that the memory device can distinguish if the data was created by a TEE as identified by the key ID(s) associated with the TEE or the data was created an entity that is not a TEE. The key ID used to create the data. The memory device may track memory ownership at a cache line granularity or at the granularity of a group of cache lines (e.g., a 4K page frame).

A memory device may support associating a cryptographic media access control (MAC) with the cache line that is encrypted using the key for a key ID. The MAC may be generated using a key uniquely associated with the key ID or may be generated using a global key.

The memory device may provide the property that data owned by a TVM is not revealed as plaintext, ciphertext, or even in the form ciphertext decrypted with a different key than used to generate the cipher text. A memory device 122 may enumerate whether the memory device supports the memory ownership tracking and the granularity at which the device tracks memory ownership.

Memory devices may support at least one memory encryption key. Memory devices may support multiple memory encryption keys. Each key supported by the memory device may be identified by a key ID where the key ID is a number that ranges from 0 to the maximum ID supported by the device (that is, number of keys—1).

Memory devices shall support the ability to extract the key ID to be used for performing a memory encryption/decryption operation from the most significant bits of the address associated with the memory transaction itself. Such a memory device may provide a configuration register to allow the TSM to configure the number N of most significant bits of the address that represent a key ID (and the remainder of the bits as an address).

Figure 2B:
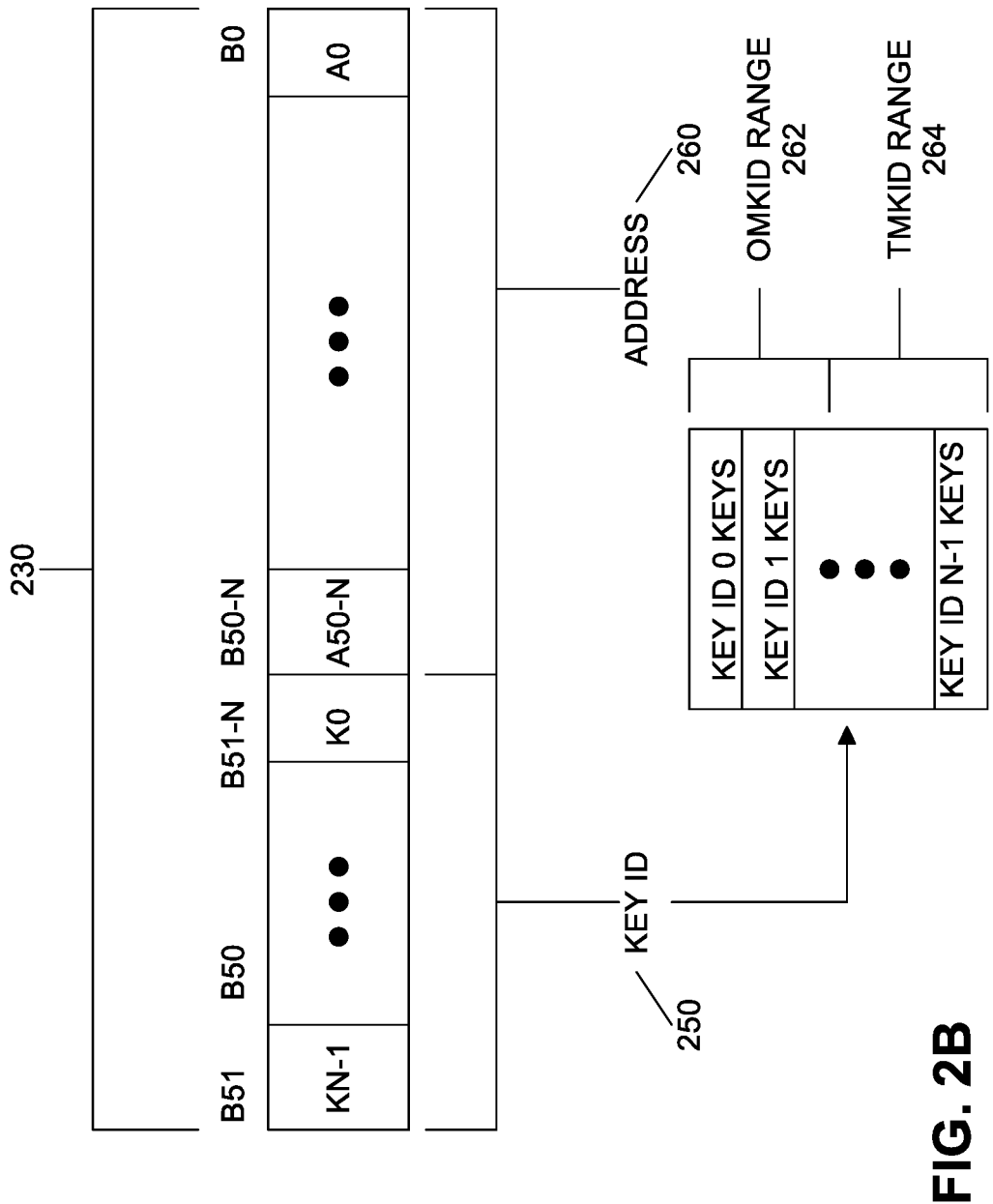
FIG. 2B is a diagram of extracting a key ID from an address field according to some embodiments.

FIG. 2B is a diagram of extracting a key ID field 250 from a memory address 230 according to some embodiments. In one embodiment, address 230 for a memory transaction includes 52 bits. The number of bits for the key ID field 250 is configurable as N, with N being a natural number. Thus, most significant bits B51-N . . . B51 comprise a key ID field (K0 . . . KN−1) 250, and the remaining least significant bits B0 . . . B50-N comprise address field 260. Key IDs may be configured into two ranges, a range for OS/VMM use (OMKID range 262) and a range for TEE VM use (TMID range 264).

A memory device may support the ability to associate a range of key IDs as key IDs used by TEEs.

Memory devices may support other methods to associate a Key ID with a memory transaction and/or to determine if a Key ID is associated with a TEE.

The TSM relies on the DSM to implement the configuration checks on the memory controller configurations.

The TSM establishes a security protocol and data model (SPDM) session with DSM and requests the DSM using the LOCK_INTERFACE_REQUEST DIMP message to lock down the memory controller configurations.

In response to the LOCK_INTERFACE_REQUEST the DSM carries out the security checks on the configurations of the memory controller, unless the configurations have already been locked and the configuration checks completed, and if the checks are successful transitions the memory controller to LOCKED state.

A successful response to a LOCK_INTERFACE_REQUEST from the DSM implies that the memory device configurations have been locked down by the DSM and the DSM has verified the memory configurations are acceptable to meet TEE security requirements.

The device side memory used by TSMs should have their memory encryption keys programmed in a trusted manner by the TSM. Once the memory controller has been transitioned to the LOCKED state, the TSM generates a START_INTERFACE_MMIO_REQUEST to the DSM to move the MEE configuration registers to the enabled state.

Figure 2C:
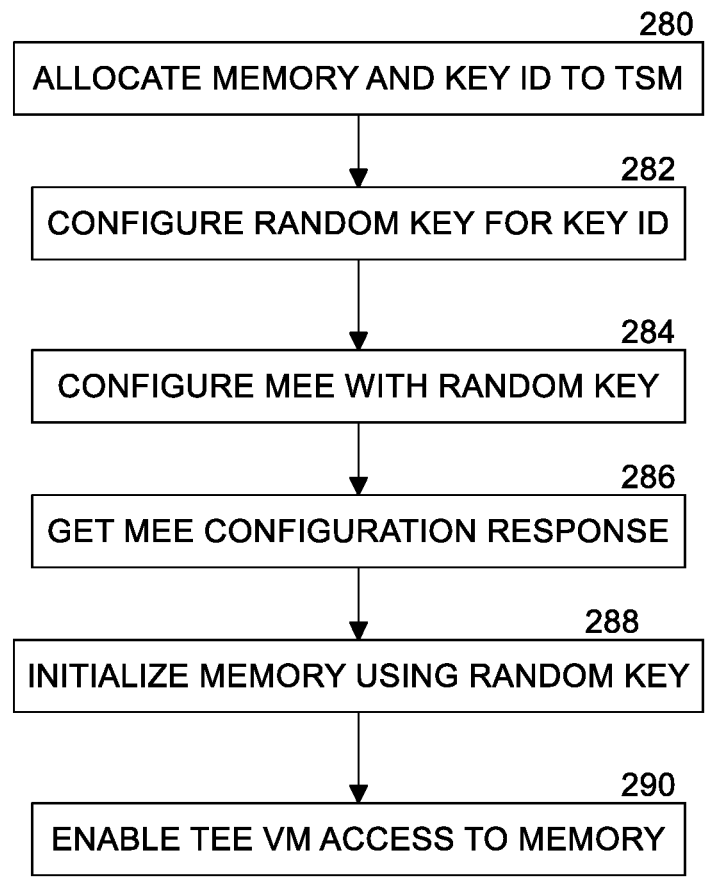
FIG. 2C illustrates another example of interactions between a VMM, a TSM, a DSM, and a MEE according to some embodiments.

FIG. 2C illustrates another example 280 of interactions between a VMM, a TSM, a DSM, and a MEE according to some embodiments. In one embodiment, memory is allocated to a TEE VM as follows. At block 280, VMM 110 allocates memory (e.g., TEE VM1 memory 136, TEE VM2 memory 138, . . . TEE VMN memory 140) for a TEE VM (e.g., TEE VM1 104, TEE VM2 106, . . . TEE VMN 108) in device memory 134 of memory device 122 by sending the memory allocation to TSM 116. VMM also allocates a key ID to the TEE VM (using one of the key IDs in TMKID range 264) by sending the key ID to TSM 116. At block 282, TSM 116 configures a random key for the key ID. In one embodiment, this is performed by sending a CONFIG_MKID_RANDOM_KEY (MKID=TMKID) request to DSM 128. At block 284, DSM 128 configures MEE 130 with the random key. A response is returned from the MEE to the DSM. At block 286, TSM 116 gets the MEE configuration response from the DSM. In one embodiment, this is performed by the DSM sending a CONFIG_MKID_RANDOM_KEY_RESPONSE message to TSM 116. At block 288, TSM 116 initializes the allocated memory using the key ID. In an embodiment, this involves sending one or more CXL memory requests to the DSM (and on to the MEE).

In an embodiment, this is done under the direction of the 116. The VMM requests the TSM to configure a MKID for a TEE VM and the TSM then proceeds to send a message to the DSM 128 to program random key for the MKID. The memory device implements a random number generator to generate this random key and programs the generated random key into the MEE (a key table may be implemented inside the MEE to hold these keys). Once the operation is complete, a response is sent back to the TSM to indicate completion. The MEE uses the MKID of an incoming request to determine the key to use for encryption/decryption to the CXL attached memory.

At block 290, TSM 116 enables secure memory access by the TEE VM to the memory. An acknowledgement of the successful memory allocation operation is then sent back to the VMM. The TEE VM can now securely transfer data between the TEE VM and TEE VM memory in device memory 134.

Figure 3:
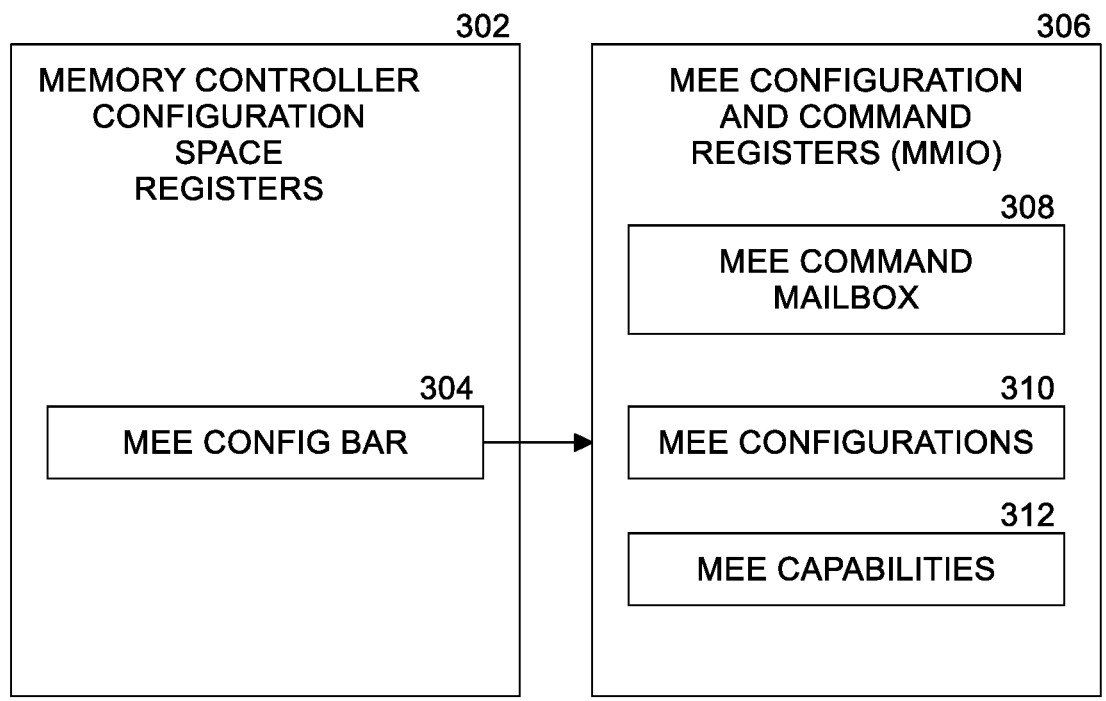
FIG. 3 illustrates an example configuration of memory controller (MC) configuration space registers and MEE configuration and command registers according to some embodiments.

FIG. 3 illustrates an example configuration 300 of memory controller (MC) 132 configuration space registers 302 and MMIO memory encryption engine (MEE) configuration and command registers 306 according to some embodiments. In an embodiment, MEE config BAR 304 in MC configuration space registers 302 points to MEE capabilities register 312 in MEE configuration and command registers 306. MEE configuration and command registers 306 also includes MEE command mailbox 308 and MEE configurations register 310.

Any reserved, unspecified, or unassigned values in enumerations or other numeric ranges are reserved for future definition of the MEE programming interface. Reserved numeric and bit fields shall be written as zero (0) and ignored when read. The device need not implement reserved fields. If the reserved fields or bit fields are implemented the device may enforce that they are written to 0.

Byte ordering of multi-byte numeric fields or multi-byte bit fields is "Little Endian" (that is, the lowest byte offset holds the least significant byte, and higher offsets hold the more significant bytes).

All fields, regardless of size or endianness, map the highest numeric bits to the highest numerically assigned byte in monotonically decreasing order until the least numerically assigned byte of that field.

In an embodiment, MEE capabilities register 312 is defined by the fields in Table 1.

TABLE 1

| Field | Offset | Size | Type | Description |
|---|---|---|---|---|
| VERSION | 0 | 1 | RO | The version field represents the version of the MEE interface specification encoded as follows: Bit 7:4-Major Version-The major version of the interface specification. The Major version is incremented when the interface change breaks backward compatibility. Bits 3:0-Minor Version-The minor version of the interface specification. A specification with a given minor version extends a specification with a lower minor version if they share the major version. The Minor Version is incremented when the modification maintains backward compatibility. |
| ALGORITHMS | 0 | 4 | RO | Supported Encryption Algorithms: Bit 0-AES-XTS-256-bit Bit 1-AES-XTS-SHA3-KMAC-256-bit Bit 2-AES-GCM-256-bit Bits 31:3-Reserved for future extensions |
| CAPABILITIES | 4 | 4 | RO | Additional Capabilities: Bit 0-Supports random key generation Bit 1-User supplied entropy for random keys supported Bit 2-Memory Integrity supported Bit 3-Memory ownership tracking supported Bit 4-Per Key ID MAC generation supported Bit 5-Per Key ID unique MAC key programming supported Bit 6-Key ID extraction from physical address supported Bit 7-TEE Key ID range programming supported Bit 8-Range based key programming supported Bit 31:10-Reserved for future extensions. Read returns 0. |

TABLE 1-continued

| Field | Offset | Size | Type | Description |
|---|---|---|---|---|
| NUM_KID | 8 | 4 | RO | Number of Key IDs supported by this MEE |
| MEM_OWNERSHIP_GRANULARITY | 12 | 4 | RO | Memory device tracks ownership if supported at granularity in units of 64-bytes enumerated in this register. |
| MAX_OWNERSHIP_TANSFER_SIZE | 16 | 4 | RO | This field is supported if the device supported memory ownership initialization command (bit 8 of CAPABILITIES enumerates 1). This field enumerates the maximum size of memory in multiples of MEM_OWNERSHIP_GRANULARITY that can be initialized by a given memory ownership initialization command. |
| NUM_RANGE_BASED_KEYS | 20 | 4 | RO | This field is supported if the device supports configuring keys based on memory ranges (bit 9 of CAPABILITIES enumerates to 1). When range-based keys are supported, the device selects the key programmed for the range at higher priority than the key specified by the Key ID of the transaction. The range-based keys are identified by a range ID-a number between 0 and (NUM_RANGE_BASED_KEYS-1). |
| RESERVED | 24 | 232 | RO | Reserved for future definition. Read returns 0. |

In an embodiment, MEE configurations register 310 is defined by the fields in Table 2.

TABLE 2

| Field | Offset | Size | Type | Description |
|---|---|---|---|---|
| PA_KID_BITS | 2 | 1 | RW | Bit 4:0-Number of bits of the physical address starting at most significant address bit that should be interpreted as Key ID. Reset default is 0. Bit 7:5-Reserved. Read return 0. Writes dropped. |
| RESERVED | 257 | 3 | RO | Reserved for future definition. Read returns 0 |
| FIRST_TEE_KID | 260 | 4 | RW | First Key ID of the range of Key ID to be associated with TEE. This register is supported if TEE Key ID range programming support is enumerated in the CAPABILITY register. Reset default is 0. If the first and/or last key ID of the range is beyond the range of key ID supported by the device, then the behavior is as defined by the device and is not specified by this specification. |
| NUM_TEE_KID | 264 | 4 | RW | Number of Key ID starting at FIRST_TEE_KID that are associated with TEEs. This register is supported if TEE Key ID range programming support is enumerated in the CAPABILITY register. Reset default is 0. |
| ENABLE | 268 | 4 | RW | All enables default to 0 at reset. Bit 0-Enable Integrity. Reserved if bit 2 of the CAPABILITIES field is 0 Bit 1-Enable Memory ownership tracking. Reserved if bit 3 of the CAPABILITIES field is 0 Bit 2-TEE Key ID range is valid. Reserved if bit 7 of the CAPABILITIES field is 0 BIT 31:2-RESERVED-READ RETURNS 0. WRITES DROPPED |
| RESERVED | 272 | 240 | RO | RESERVED FOR FUTURE DEFINITION. READ RETURNS 0 |

In an embodiment, MEE command mailbox 308 is defined by the fields in Table 3.

TABLE 3

| Field | Offset | Size | Type | Description |
|---|---|---|---|---|
| COMMAND | 512 | 2 | W | Command written to mailbox: 0-Invalid command 1-Configures specified key 2-Configure random key 3-Clear configured key 5-Configure specified range-based keys 6-Configure random range-based keys |
| STATUS | 514 | 2 | RO | Status of configuration request 0-Success 1-MAILBOX_BUSY 2-INVALID_COMMAND 3-INSUFFICIENT_ENTROPY 4-INVALID_KEYID 5-INVALID_ALGORITHM 6-DEVICE_BUSY 7-INVALID_PARAMS |
| GO | 516 | 1 | W | Write 1 to commit |
| RESERVED | 517 | 3 | RO | Reserved for future definition. Read returns 0 |
| COMMAND_PARAM | 520 | 5 | W | Parameters for the command. See command definition. |

To issue a command, software writes the COMMAND register and COMMAND_PARAM register with the command and the parameters for the command. Once all parameters have been written, software writes the GO register to 1 to initiate processing of the command. After GO register is set to 1, software can poll on the STATUS register while the software reads MAILBOX_BUSY. MAILBOX_BUSY is not an error code and is an indication that the device is processing a previously submitted command. Software may alternately enable the MEE to interrupt on command completion and read the STATUS register on interrupt to determine the command status.

The behavior of the COMMAND or COMMAND_PARAM registers are modified when the STATUS is MAILBOX_BUSY is defined by the device and is not defined by this specification.

If the COMMAND specified is invalid, then the MEE may return INVALID_COMMAND error code. If reserved fields of the COMMAND_PARAM are set to 1, then the MEE may return INVALID_PARAMS error code.

Once the operation is complete if the operation was successful, the STATUS returns SUCCESS else an error code is returned.

The reset default of all fields of the mailbox may be 0. On operation completion, the device may initialize the COMMAND and COMMAND_PARAM fields to 0 in preparation of receiving the next command.

The following sections detail the format of the COMMAND_PARAM field for the supported commands. The offsets in the parameters table are relative to the first byte of the COMMAND_PARAM registers.

Command 1—Configure Specified Key. This command is used to configure a software specified key for a Key ID in the MEE. The command parameters are as follows in Table 4.

TABLE 4

| Field | Offset | Size | Type | Description |
|---|---|---|---|---|
| KEY_ID | 0 | 4 | W | Key ID |
| ALGORITHM | 4 | 4 | W | Encryption Algorithm to use-may be one of the supported algorithms. |
| DATA_KEY | 8 | 32 | W | Data encryption key. |
| TWEAK_KEY | 40 | 32 | W | Tweak Key if required by the selected ALGORITHM. This field is reserved and may be 0 if not required by the selected algorithm. |
| MAC_KEY | 72 | 32 | W | MAC Key if required by the selected ALGORITHM. If MAC key is not required by the selected algorithm, then this field may be 0. This field is reserved and may be 0 if CAPABILITY register bit 5 is 0. |
| Reserved | 104 | 408 | W | Reserved. May be zero. |

Command 2—Configure Random Key. This command is used to configure a device generated random key for a Key ID in the MEE. The memory device may support user provided entropy to be mixed into the key generation. If the device does not enumerate support for user provided entropy, then the corresponding parameters may be set to 0 and treated as reserved. The command parameters are as follows in Table 5.

TABLE 5

| Field | Offset | Size | Type | Description |
|---|---|---|---|---|
| KEY_ID | 0 | 4 | W | Key ID |
| ALGORITHM | 4 | 4 | W | Encryption Algorithm to use-may be one of the supported algorithms. |
| DATA_KEY_ENTROPY | 8 | 32 | W | Additional user supplied data encryption key entropy. This field is reserved if bit 1 of CAPABILITIES is 0. |
| TWEAK_KEY_ENTROPY | 40 | 32 | W | Additional user supplied tweak Key entropy if required by the selected ALGORITHM. This field is reserved if bit 1 of CAPABILITIES is 0. |
| MAC_KEY_ENTROPY | 72 | 32 | W | Additional user supplied MAC Key entropy if required by the selected ALGORITHM. This field is supported if CAPABILITY register bit 4 is 0 or if bit 1 of CAPABILITIES is 0. |
| Reserved | 104 | 408 | W | Reserved. May be zero. |

Command 3—Configure Random Key. This command is used to clear a previously configured key for a Key ID. The command parameters are as follows in Table 6.

TABLE 6

| Field | Offset | Size | Type | Description |
|---|---|---|---|---|
| KEY_ID | 0 | 4 | W | Key ID |
| Reserved | 4 | 508 | W | Reserved. May be zero. |

Command 5—Configure specified Range-based Keys. This command is used to configure a software specified key for a memory range in the MEE. This command is supported if bit 9 of CAPABILITIES is 1. The command parameters are as follows in Table 7.

TABLE 7

| Field | Offset | Size | Type | Description |
|---|---|---|---|---|
| RANGE_ID | 0 | 4 | W | Range ID |
| ALGORITHM | 4 | 4 | W | Encryption Algorithm to use-may be one of the supported algorithms. |
| DATA_KEY | 8 | 32 | W | Data encryption key. |
| TWEAK_KEY | 40 | 32 | W | Tweak Key if required by the selected ALGORITHM. This field is reserved and may be 0 if not required by the selected algorithm. |
| MAC_KEY | 72 | 32 | W | MAC Key if required by the selected ALGORITHM. If MAC key is not required by the selected algorithm, then this field may be 0. This field is reserved and may be 0 if CAPABILITY register bit 5 is 0. |
| RANGE_BASE | 104 | 8 | W | Bit 63:12-Bit 63:12 of base address of the range. This base address may be aligned to the size of the range specified by RANGE_SIZE. Bit 11:1-Reserved-may be 0 Bit 0-Lock-if lock set to 1 then device may not accept a subsequent command to program keys to this range |
| RANGE_SIZE | 112 | 8 | W | Size address of the range. This parameter may be a valid power of two and may not be smaller than 4096. |
| Reserved | 120 | 392 | W | Reserved. May be zero. |

The device may return INVALID_PARAMS error code if one or more of following are TRUE: Range ID is invalid;

this range has been locked from any further key programming; RANGE_BASE is not a valid address for the memory device; RANGE_BASE is not aligned to the RANGE_SIZE; RANGE_SIZE is not a power of two. The last address of the range is not a valid address for the memory device.

Command 6—Configure random Range-based Keys. This command is used to configure a software specified key for a memory range in the MEE. This command is supported if bit 9 of CAPABILITIES is 1 and bit 0 of CAPABILITIES is 1. The command parameters are as follows in Table 8.

TABLE 8

| Field | Offset | Size | Type | Description |
|---|---|---|---|---|
| RANGE_ID | 0 | 4 | W | Range ID |
| ALGORITHM | 4 | 4 | W | Encryption Algorithm to use-may be one of the supported algorithms. |
| DATA_KEY_ENTROPY | 8 | 32 | W | Additional user supplied data encryption key entropy. This field is reserved if bit 1 of CAPABILITIES is 0. |
| TWEAK_KEY_ENTROPY | 40 | 32 | W | Additional user supplied tweak Key entropy if required by the selected ALGORITHM. This field is reserved if bit 1 of CAPABILITIES is 0. |
| MAC_KEY_ENTROPY | 72 | 32 | W | Additional user supplied MAC Key entropy if required by the selected ALGORITHM. This field is supported if CAPABILITY register bit 4 is 0 or if bit 1 of CAPABILITIES is 0. |
| RANGE_BASE | 104 | 8 | W | Bit 63:12-Bit 63:12 of base address of the range. This base address may be aligned to the size of the range specified by RANGE_SIZE. Bit 11:1-Reserved-may be 0 Bit 0-Lock-if lock set to 1 then device may not accept a subsequent command to program keys to this range. |
| RANGE_SIZE | 112 | 8 | W | Size address of the range. This parameter may be a valid power of two and may not be smaller than 4096. |
| Reserved | 104 | 408 | W | Reserved. May be zero. |

The device may return INVALID_PARAMS error code if one or more of following are TRUE: Range ID is invalid; this range has been locked from any further key programming; RANGE_BASE is not a valid address for the memory device; RANGE_BASE is not aligned to the RANGE_SIZE; RANGE_SIZE is not a power of two. The last address of the range is not a valid address for the memory device.

A memory transaction causes a fatal error if the Key ID accessed by the transaction does not have a valid key configured. If the memory transaction is a write, then the MEE may drop the transaction. If it the memory transaction is a read, then the MEE may return fixed data (e.g. 0) with poison.

If a memory transaction matches the address range configured for a range-based key, then the key configured for that range is used for the encryption/decryption operation instead of the key programmed into the Key ID associated with the transaction. If multiple ranges match a transaction, then the behavior of the memory device is not defined by this specification.

A memory transaction causes a fatal error if the Key ID accessed by the transaction is a TEE associated Key ID but the key for the Key ID was not configured when the MEE was in a RUN.mmio state. If the memory transaction is a write, then the MEE may drop the transaction. If it the memory transaction is a read, then the MEE may return fixed data (e.g., 0) with poison.

A MEE that supports integrity may return fixed data (e.g., 0) with poison in response to a memory read that violates the memory integrity checks for the Key ID used to perform the read.

A MEE that supports tracking memory ownership may return fixed data (e.g., 0) in response to a read with a Key ID that was not used to create that data.

Figure 4:
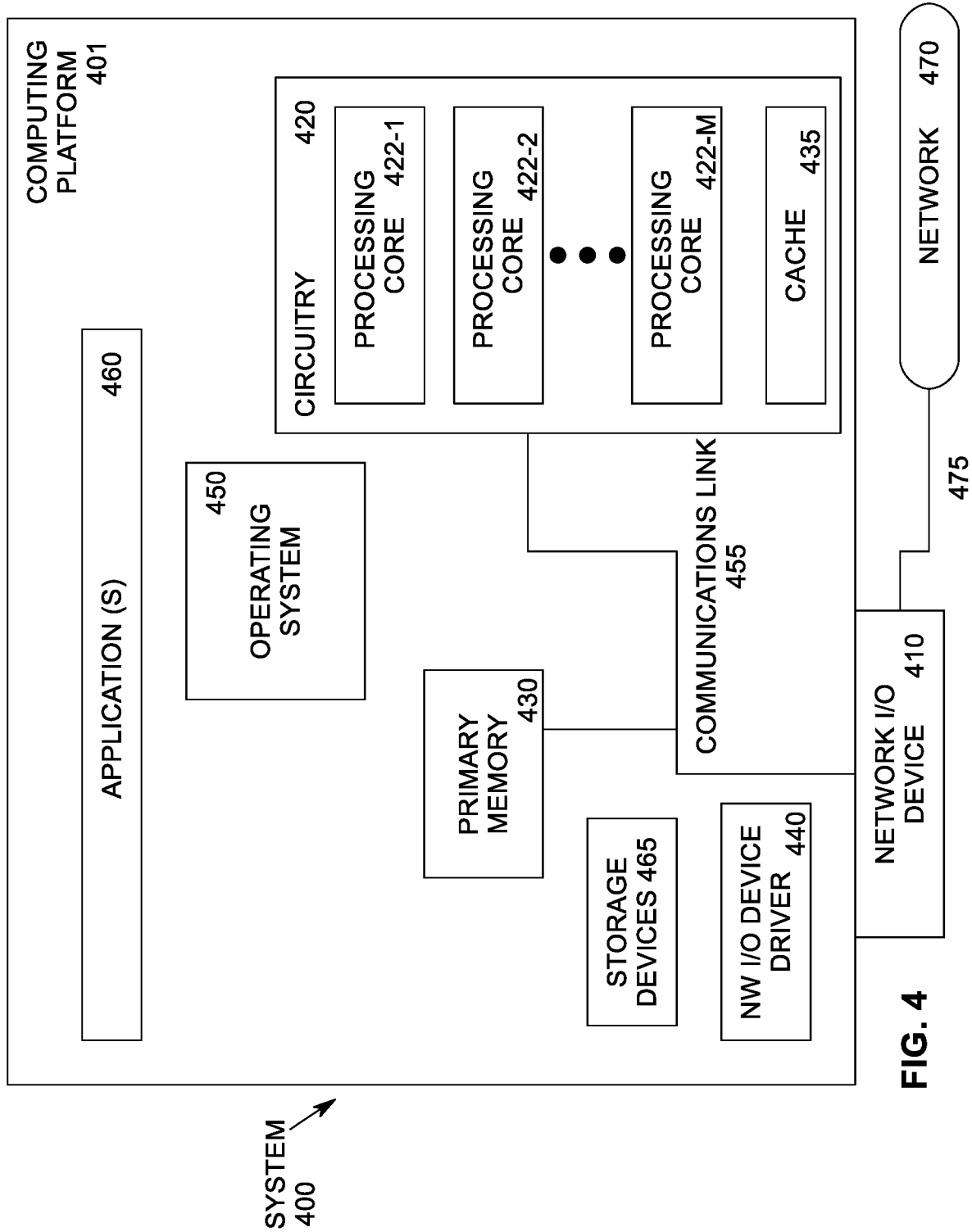
FIG. 4 illustrates an example computing platform.

FIG. 4 illustrates an example computing system 400. In an embodiment, computing system 400 is an example of at least portions of host computing system 102 and/or memory device 122. As shown in FIG. 4, computing system 400 includes a computing platform 401 coupled to a network 470. In some examples, as shown in FIG. 4, computing platform 401 may couple to network 470 via a network communication channel 475 and through a network I/O device 410 (e.g., a network interface controller (NIC)) having one or more ports connected or coupled to network communication channel 475.

According to some examples, computing platform 401, as shown in FIG. 4, may include circuitry 420, primary memory 430 (also called local memory), a network (NW) I/O device driver 440, an operating system (OS) 450, one or more application(s) 460, and memory devices 465 (such as memory system 114). In at least one embodiment, memory devices 465 may comprise one or more of hard disk drives (HDDs) and/or solid-state drives (SSDs). In an embodiment, memory devices 465 may be non-volatile memories (NVMs). In some examples, as shown in FIG. 4, circuitry 420 may communicatively couple to primary memory 430 and network I/O device 410 via communications link 455. Although not shown in FIG. 4, in some examples, operating system 450, NW I/O device driver 440 or application(s) 460 may be implemented, at least in part, via cooperation between one or more memory devices included in primary memory 430 (e.g., volatile or non-volatile memory devices) and elements of circuitry 420 such as processing cores 422-1 to 422-m, where "m" is any positive whole integer greater than 2.

In some examples, computing platform 401, may include, but is not limited to, a server, a server array or server farm, a web server, a network server, an Internet server, a workstation, a mini-computer, a main frame computer, a supercomputer, a network appliance, a web appliance, a distributed computing system, multiprocessor systems, processor-based systems, a laptop computer, a tablet computer, a smartphone, or a combination thereof. Also, circuitry 420 having processing cores 422-1 to 422-m may include various commercially available processors, including without limitation Intel® Atom®, Celeron®, Core (2) Duo®, Core i3, Core i5, Core i7, Itanium®, Pentium®, Xeon® or Xeon Phi® processors; ARM processors, AMD processors, and similar processors. Circuitry 420 may include at least one cache 435 to store data.

According to some examples, primary memory 430 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAM). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 430 may include one or more hard disk drives within and/or accessible by computing platform 401.

Figure 5:
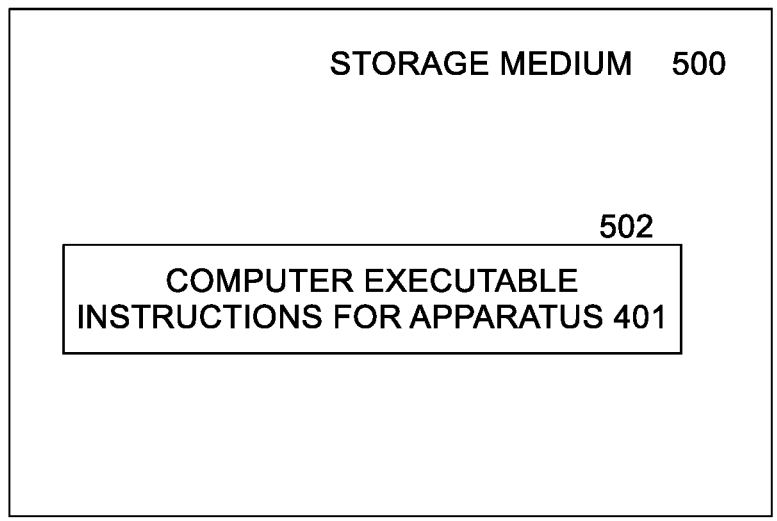
FIG. 5 illustrates an example of a storage medium.

FIG. 5 illustrates an example of a storage medium 500. Storage medium 500 may comprise an article of manufacture. In some examples, storage medium 500 may include any non-transitory tangible computer readable medium or machine-readable medium, such as an optical, magnetic or semiconductor memory. Storage medium 500 may store various types of computer executable instructions, such as instructions 502 for apparatus 401. In some embodiments, instructions 502 may include one or more of TEE VMs 104, 106, . . . 108, TSM 116, DSM 128, and MEE configuration interface 126. Examples of a computer readable or machine-readable memory medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 6:
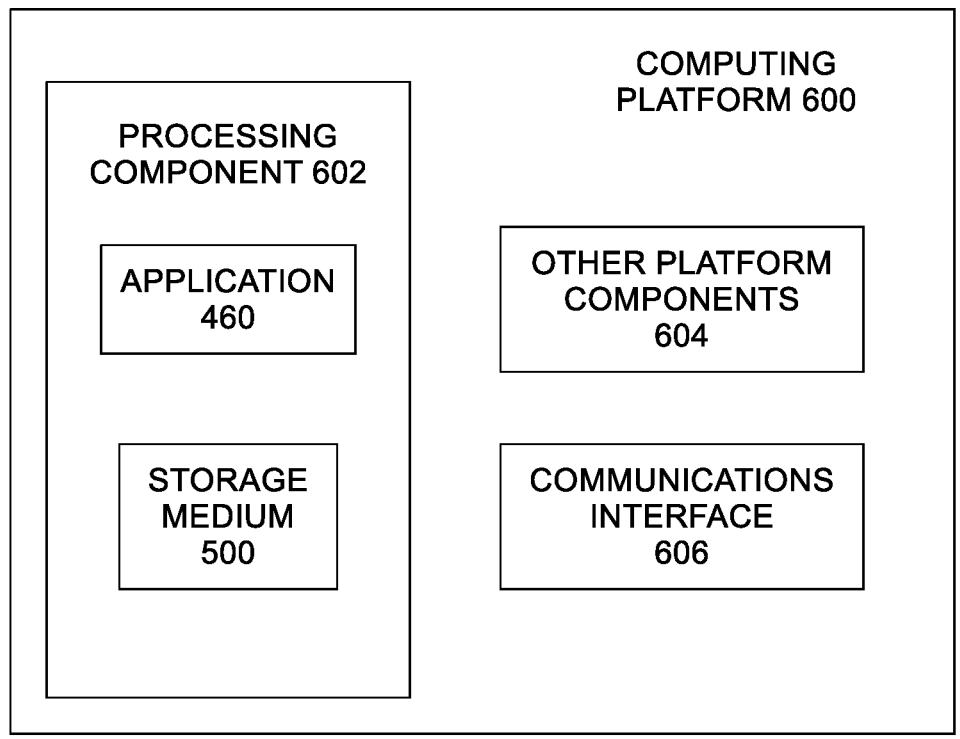
FIG. 6 illustrates another example computing platform.

FIG. 6 illustrates an example computing platform 600. In some examples, as shown in FIG. 6, computing platform 600 may include a processing component 602, other platform components 604 and/or a communications interface 606.

According to some examples, processing component 602 may execute processing operations or logic for application 460 and/or memory medium 500. Application 460 may be run in one of TEE VMs 104, 106, . . . 108 and access data in memory device 122. In an embodiment, application 460 comprises TSM 116. Processing component 602 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, AI cores, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 604 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable memory media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer-readable and machine-readable memory media may also include magnetic or optical cards, an array of devices such as Redundant Array of Independent Disks (RAID) drives, solid state memory devices (e.g., USB memory), solid state drives (SSD) and any other type of memory media suitable for storing information.

In some examples, communications interface 606 may include logic and/or features to support a communication interface. For these examples, communications interface 606 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Switch Specification.

The components and features of computing platform 600 may be implemented using any combination of discrete circuitry, ASICs, logic gates and/or single chip architectures. Further, the features of computing platform 600 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 600 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one tangible, non-transitory machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGAs, AI accelerators/cores, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory memory medium to store logic. In some examples, the non-transitory memory medium may include one or more types of computer-readable memory media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine-readable medium, such as an optical, magnetic or semiconductor memory. The embodiments are not limited in this context.

The following examples pertain to further embodiments.

Example 1 is an apparatus including a processor; and a local memory coupled to the processor. The local memory includes instructions stored thereon that, in response to execution by the processor, cause the processor to receive allocation of remote memory in a memory device and a key identifier (ID) to a trusted execution environment virtual machine (TEE VM); configure a random key for the key ID by sending a random key configuration request to instruct a device security manager (DSM) of the memory device to configure a memory encryption engine (MEE) of the memory device with the random key and the memory allocation; initialize the allocated remote memory using the random key; and enable secure access by the TEE VM to the allocated remote memory over a compute express link (CXL) by encrypting data transfers from the TEE VM to the memory device using the random key or decrypting data transfers from the memory device to the TEE VM using the random key.

In Example 2, the subject matter of Example 1 can optionally include wherein the local memory includes instructions that, when executed by the processor, cause the processor to initialize the allocated remote memory using the key ID by sending one or more CXL memory requests to the DSM.

In Example 3, the subject matter of Example 1 can optionally include wherein an address of a memory location in the memory device comprises a key ID field to store the key ID and an address field to store a memory address, the key ID field comprising a most significant N bits of the address and the address field comprising a remainder of the bits of the address, N being a configurable natural number.

In Example 4, the subject matter of Example 3 can optionally include wherein the local memory includes instructions that, when executed by the processor, cause the processor to configure a range of key IDs into a first range for use by a virtual machine manager (VM)) and a second range for use by the TEE VM.

In Example 5, the subject matter of Example 1 can optionally include wherein the local memory includes instructions that, when executed by the processor, cause the processor to establish a secure communications session with the DSM in the memory device; establish encryption keys for protecting, by encryption, data transfers over the CXL; send a lock interface request to the DSM to lock the CXL; discover capabilities of the MEE; and set a configuration of the MEE.

In Example 6, the subject matter of Example 5 can optionally include wherein instructions to set the configuration of the MEE comprise instructions to assign the key ID to the TEE VM and configure a random key in the MEE for the key ID.

In Example 7, the subject matter of Example 1 can optionally include wherein the local memory includes instructions that, when executed by the processor, cause the processor to authenticate a hardware identity of the DSM.

Example 8 is a method including receiving allocation of memory in a memory device and a key identifier (ID) to a trusted execution environment virtual machine (TEE VM); configuring a random key for the key ID by sending a random key configuration request to instruct a device security manager (DSM) of the memory device to configure a memory encryption engine (MEE) of the memory device with the random key and the memory allocation; initializing the allocated memory using the random key; and enabling secure access by the TEE VM to the allocated memory over a compute express link (CXL) by encrypting data transfers from the TEE VM to the memory device using the random key or decrypting data transfers from the memory device to the TEE VM using the random key.

In Example 9, the subject matter of Example 8 can optionally include initializing the allocated memory using the key ID by sending one or more CXL memory requests to the DSM.

In Example 10, the subject matter of Example 8 can optionally include wherein an address of a memory location in the memory device comprises a key ID field to store the key ID and an address field to store a memory address, the key ID field comprising a most significant N bits of the address and the address field comprising a remainder of the bits of the address, N being a configurable natural number.

In Example 11, the subject matter of Example 8 can optionally include configuring a range of key IDs into a first range for use by a virtual machine manager (VM)) and a second range for use by the TEE VM.

In Example 12, the subject matter of Example 8 can optionally include establishing a secure communications session with the DSM in the memory device; establishing encryption keys for protecting, by encryption, data transfers over the CXL; sending a lock interface request to the DSM to lock the CXL; discovering capabilities of the MEE; and setting a configuration of the MEE.

Example 13 is at least one non-transitory machine-readable memory medium comprising instructions that, when executed, cause at least one processor to receive allocation of memory in a memory device and a key identifier (ID) to a trusted execution environment virtual machine (TEE VM); configure a random key for the key ID by sending a random key configuration request to instruct a device security manager (DSM) of the memory device to configure a memory encryption engine (MEE) of the memory device with the random key and the memory allocation; initialize the allocated memory using the random key; and enable secure access by the TEE VM to the allocated memory over a compute express link (CXL) by encrypting data transfers from the TEE VM to the memory device using the random key or decrypting data transfers from the memory device to the TEE VM using the random key.

In Example 14, the subject matter of Example 13 can optionally include instructions, when executed by the at least one processor, cause the at least one processor to initialize the allocated memory using the key ID by sending one or more CXL memory requests to the DSM.

In Example 15, the subject matter of Example 13 can optionally include wherein an address of a memory location in the memory device comprises a key ID field to store the key ID and an address field to store a memory address, the key ID field comprising a most significant N bits of the address and the address field comprising a remainder of the bits of the address, N being a configurable natural number.

In Example 16, the subject matter of Example 15 can optionally include instructions, when executed by the at least one processor, cause the at least one processor to configure a range of key IDs into a first range for use by a virtual machine manager (VM)) and a second range for use by the TEE VM.

In Example 17, the subject matter of Example 13 can optionally include instructions, when executed by the at least one processor, cause the at least one processor to establish a secure communications session with the DSM in the memory device; establish encryption keys for protecting, by encryption, data transfers over the CXL; send a lock interface request to the DSM to lock the CXL; discover capabilities of the MEE; and set a configuration of the MEE.

Example 18 is a system including a compute express link (CXL); a memory device coupled to the CXL, the memory device including a memory, a memory encryption engine (MEE) and a device security manager (DSM); and a host computing system coupled to the CXL, the host computing system including at least one trusted execution environment virtual machine (TEE VM) and a trusted execution environment security manager (TSM); wherein the TSM is to receive allocation of memory in the memory device and a key identifier (ID) to the at least one TEE VM; configure a random key for the key ID by sending a random key configuration request to instruct the DSM to configure the MEE with the random key and the memory allocation; initialize the allocated memory using the random key; and enable secure access by the at least one TEE VM to the allocated memory over the CXL by encrypting data transfers from the TEE VM to the memory device using the random key or decrypting data transfers from the memory device to the TEE VM using the random key.

In Example 19, the subject matter of Example 18 can optionally include wherein the TSM is to initialize the allocated memory using the key ID by sending one or more CXL memory requests to the DSM.

In Example 20, the subject matter of Example 18 can optionally include wherein an address of a memory location in the memory device comprises a key ID field to store the key ID and an address field to store a memory address, the key ID field comprising a most significant N bits of the address and the address field comprising a remainder of the bits of the address, N being a configurable natural number.

In Example 21, the subject matter of Example 20 can optionally include wherein the TSM is to configure a range of key IDs into a first range for use by a virtual machine manager (VM)) and a second range for use by the TEE VM.

In Example 22, the subject matter of Example 18 can optionally include wherein the TSM is to establish a secure communications session with the DSM in the memory device; establish encryption keys for protecting, by encryption, data transfers over the CXL; send a lock interface request to the DSM to lock the CXL; discover capabilities of the MEE; and set a configuration of the MEE.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
processor circuitry coupled with a memory, the processor circuitry to:
configure a key based on a key ID associated with a trusted execution environment (TEE) virtual machine (VM) and instruct a memory device to configure a memory encryption engine (MEE) of the memory device based on the key and allocation of remote memory in the memory device;
initialize the allocated remote memory using the key; and
enable secure access by the TEE VM to the allocated remote memory over a system interconnect by encrypting or decrypting data transfers between the TEE VM and the memory device using the key.

2. The apparatus of claim 1, wherein the processor circuitry is further to:
initialize the allocated remote memory using the key ID by sending one or more memory requests to the memory device.

3. The apparatus of claim 1, wherein the memory device includes a memory location associated with an address comprising a key ID field to store the key ID and an address field to store the address, the key ID field comprising a most significant N bits of the address and the address field comprising a remainder of the bits of the address, N being a configurable natural number.

4. The apparatus of claim 3, wherein the processor circuitry is further to:
configure a range of key IDs into a first range for use by a virtual machine manager (VMM) and a second range for use by the TEE VM, wherein the processor circuitry comprises application processor circuitry or graphics processor circuitry.

5. The apparatus of claim 1, wherein the processor circuitry is further to:
establish a secure communications session with a device security manager (DSM) circuitry hosted by the memory device, wherein the processor circuitry authenticates a hardware identity of the DSM;
establish encryption keys for protecting, by encryption, data transfers over the system interconnect including compute express link (CXL);
send a lock interface request to the memory device to lock the system interconnect;
discover capabilities of the MEE; and
set a configuration of the MEE, wherein the key ID is assigned to the TEE VM and the key is configured for the key ID in the MEE.

6. A method comprising:
configuring, by a computing device, a key based on a key ID associated with a trusted execution environment (TEE) virtual machine (VM) and instruct a memory device to configure a memory encryption engine (MEE) of the memory device based on the key and allocation of remote memory in the memory device;
initializing the allocated remote memory using the key; and
enabling secure access by the TEE VM to the allocated remote memory over a system interconnect by encrypting or decrypting data transfers between the TEE VM and the memory device using the key.

7. The method of claim 6, further comprising:
initializing the allocated remote memory using the key ID by sending one or more memory requests to the memory device.

8. The method of claim 6, wherein the memory device includes a memory location associated with an address comprising a key ID field to store the key ID and an address field to store the address, the key ID field comprising a most significant N bits of the address and the address field comprising a remainder of the bits of the address, N being a configurable natural number.

9. The method of claim 8, further comprising:
configuring a range of key IDs into a first range for use by a virtual machine manager (VMM) and a second range for use by the TEE VM, wherein the computing device comprises one or more processors including one or more application processors or one or more graphics processors.

10. The method of claim 6, further comprising:
establishing a secure communications session with a device security manager (DSM) circuitry hosted by the memory device, wherein the processor circuitry authenticates a hardware identity of the DSM;
establishing encryption keys for protecting, by encryption, data transfers over the system interconnect including compute express link (CXL);
sending a lock interface request to the memory device to lock the system interconnect;
discovering capabilities of the MEE; and setting a configuration of the MEE, wherein the key ID is assigned to the TEE VM and the key is configured for the key ID in the MEE.

11. At least one non-transitory computer-readable medium having stored thereon instructions which, when executed, cause a computing device to perform operations comprising:

configuring a key based on a key ID associated with a trusted execution environment (TEE) virtual machine (VM) and instruct a memory device to configure a memory encryption engine (MEE) of the memory device based on the key and allocation of remote memory in the memory device;

initializing the allocated remote memory using the key; and enabling secure access by the TEE VM to the allocated remote memory over a system interconnect by encrypting or decrypting data transfers between the TEE VM and the memory device using the key.

12. The non-transitory computer-readable medium of claim 11, wherein the operations further comprise:

initializing the allocated remote memory using the key ID by sending one or more memory requests to the memory device.

13. The non-transitory computer-readable medium of claim 11, wherein the memory device includes a memory location associated with an address comprising a key ID field to store the key ID and an address field to store the address, the key ID field comprising a most significant N bits of the address and the address field comprising a remainder of the bits of the address, N being a configurable natural number.

14. The non-transitory computer-readable medium of claim 13, wherein the operations further comprise:

configuring a range of key IDs into a first range for use by a virtual machine manager (VMM) and a second range for use by the TEE VM, wherein the one or more processors comprise one or more application processors or one or more graphics processors.

15. The non-transitory computer-readable medium of claim 11, wherein the operations further comprise:

establishing a secure communications session with a device security manager (DSM) circuitry hosted by the memory device, wherein the processor circuitry authenticates a hardware identity of the DSM;

establishing encryption keys for protecting, by encryption, data transfers over the system interconnect including compute express link (CXL);

sending a lock interface request to the memory device to lock the system interconnect;

discovering capabilities of the MEE; and setting a configuration of the MEE, wherein the key ID is assigned to the TEE VM and the key is configured for the key ID in the MEE.

* * * * *